Figures 1, 2, 3, 4:
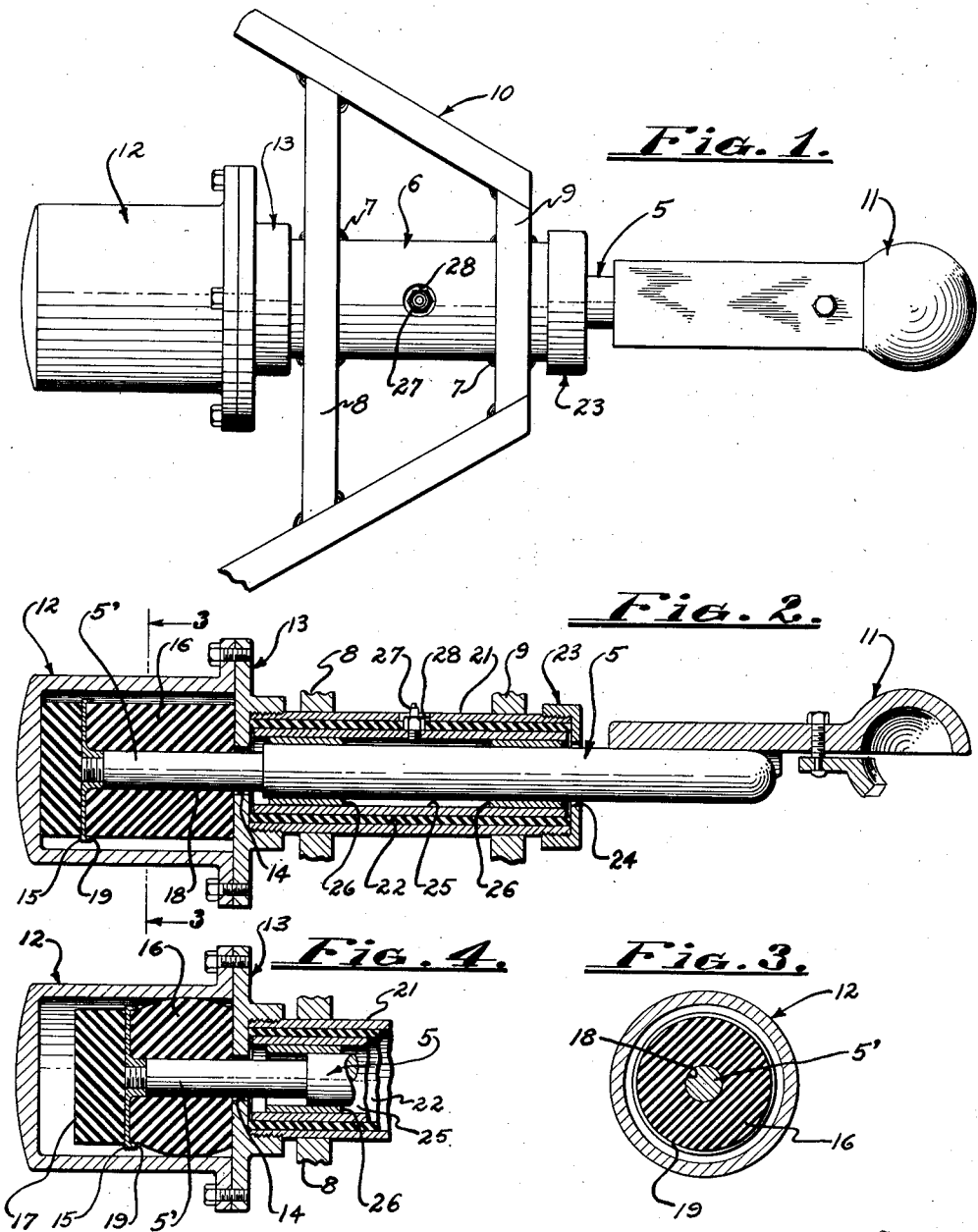

July 4, 1950 — J. H. GRUBE — 2,513,932
VEHICLE DRAFT HITCH
Filed Nov. 5, 1946

Inventor
JOHN H. GRUBE
By R. S. Berry
Attorney

Patented July 4, 1950

2,513,932

UNITED STATES PATENT OFFICE 2,513,932

VEHICLE DRAFT HITCH

John H. Grube, Pasadena, Calif., assignor, by mesne assignments, to Overniter Manufacturing Corporation, a corporation of California Application November 5, 1946, Serial No. 707,887

2 Claims. (Cl. 280—33.9)

This invention relates to hitches for making draft connections between vehicles, for example between trailers and towing vehicles.

One of the objects of this invention is to provide a hitch of the character described which is constructed and arranged to absorb vibrations, shocks and jars in a particularly efficacious manner during the use of the hitch between a towed vehicle and a towing vehicle so as to prevent objectional shocks and jars from being transmitted one vehicle to the other and from damaging or disconnecting the hitch itself.

Another object of this invention is to provide a hitch of the character described which is cushioned by means of a novel arrangement of resilient rubber cushioning members in combination with a reciprocable draft bar.

An additional object is to provide in a hitch of the character described a novel form of cushioned bearing unit arranged to reciprocably support the draw bar with the latter subject to gyratory movement and in fact a controlled universal movement in such manner that the cushioning element of the bearing unit will effectively absorb vibrations and shocks which would tend to disconnect the hitch and prove objectionable in vehicles associated therewith.

A further object is to provide a hitch such as described wherein one end of the reciprocable draw bar is provided with a head movable between two resilient rubber elements in a housing supported by the bearing unit whereby in combination with the bearing unit which is fixed to the frame of the trailer or vehicle to be towed, shock absorbing and cushioning elements of the hitch will yield responsive to all movement of the draw bar and prevent shocks, jars and vibrations from being objectionably transferred from one vehicle to the other.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a top plan view of a hitch embodying the present invention as applied to a trailer, a part of the frame of which is here shown, Fig. 2 is a longitudinal sectional view of the hitch, Fig. 3 is a cross sectional view taken on the line 3—3 of Fig. 2, and Fig. 4 is a fragmentary sectional view similar to Fig. 2 but showing the parts as under an extreme load with the main cushioning element compressed and expanded.

Referring to the drawings more specifically, 5 designates, a draw bar which is reciprocably supported between its ends in a cushioned bearing unit 6 welded as at 7 to the cross members 8 and 9 of the frame 10 of a trailer or vehicle to be towed. Only the frame of the trailer or vehicle is here shown and it should be understood that the bearing unit may be fastened to the vehicle in any suitable manner.

On its outer end the draw bar 5 is provided with a suitable means 11 affording a swiveled draft connection with a towing vehicle not shown.

As here provided a cylindrical housing 12 is bolted or otherwise secured to a flanged cap 13 screwed onto the bearing unit 6. A reduced end portion 5' of the draw bar is extended freely through a large opening 14 in the cap 13 into the housing 12, said opening being of such greater diameter than the draw bar portion 5' as to permit of a substantially universal movement of said draw bar relative to the cap and housing.

On the free end of the reduced portion 5' of the draw bar is fixed a piston-like head 15 which is well circumferentially spaced from the cylindrical wall of the housing and arranged to move with the draw bar against the action of cylindrical cushioning members 16 and 17 of resilient rubber which members are also normally well circumferentially spaced from said cylindrical wall. The rubber member 16 has a bore 18, through which the draw bar extends and is located between and in contact with the cap 13 and the head 15, there being a peripheral flange 19 on said head for holding the adjacent end of member 16 in place so that it will yield and cushion all towing shocks and jars and will be compressed and expanded for example as shown in Fig. 4, under loads and shocks. The member 17 is cemented, vulcanized or otherwise secured to the head 15 and is normally in contact with the end wall 20 of the housing 12 so that it will resist and cushion movement of the draw bar towards the end wall 20 as occasioned on backing the towed vehicle and when shocks cause a rearward movement of the draw bar.

The cushioned bearing unit 6 includes a cylindrical steel housing 21 which is welded or otherwise secured adjacent its ends as at 7 to the frame members 8 and 9 of the vehicle frame 10 as a rigid support for the other elements of the unit. Mounted within the housing 2 as a thick lining extending the full length thereof is a resilient rubber cushion sleeve or tube 22. One end of this sleeve abuts the cap 13 and the other a cap 23 on the outer end of the housing 21. An opening 24 in the cap 23 permits of free universal movement of the draw bar relative to the cap and associated housing. A tubular steel bearing sleeve 25 is fitted within the cushion sleeve 22 and carries adjacent its ends like bearing bushings 26 which surround the draw bar 5 as the main bearings therefor. The outer ends of these bearing bushings and the ends of the sleeve 25 are spaced somewhat from the caps 13 and 23 whereby these bearing parts are subject to yielding responsive to angular movements of the reciprocable draw bar thereby absorbing shocks and vibrations incident to such movements. This cushioned bearing arrangement in combination with the arrangement of the cushions 16 and 17 provides a "floating" resilient support of the draw bar whereby all movements of the draw bar are cushioned and objectionable shocks and vibrations are prevented from being transmitted from the towed vehicle to the towing vehicle and vice versa as well as from damaging or disconnecting the hitch itself.

It should be noted that in having the bearing unit 6 disposed between the ends of the draw bar to support the draw bar for reciprocable and angular or gyratory movement against the resilient action of the rubber members 16, 17 and 21, all shock and jar and vibratory movements of the draw bar will be dampened and absorbed in the particularly advantageous manner.

It will also be noted that when the draw bar is pulled outwardly against the cushion member 16, said member will expand radially as it is compressed and contact the cylindrical wall of the housing 12 as shown in Fig. 2 thereby setting up a frictional and yielding resistance component radially thereof in addition to being compressed axially to the end that a more pronounced cushioning and shock absorbing action is provided for.

As means for lubricating the bearing, a valved lubricant intake member 27 is screwed into the bearing supporting sleeve 25 so that the lubricant will reach the draw bar and bearing bushings 26. The member 27 extends through an opening 28 in the housing 21 of sufficient size to permit of free movement of the member 27 relative to the housing when the draw bar and bearing elements which move therewith are moved against the action of the cushion elements of the hitch.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a hitch for making a draft connection between vehicles, a bearing unit adapted to be mounted on a vehicle to be towed, a draw bar slidably mounted in said bearing unit and projecting from opposite sides thereof, means on one end of said bar for making a draft connection with a towing vehicle, a cylindrical housing supported on one end of said bearing unit and into which the other end of said draw bar extends, a head fixed to said other end of said draw bar, and cushioning blocks of rubber mounted on opposite sides of said head in circumferentially spaced relation to the cylindrical wall of said housing for resisting sliding movement of said draw bar, said bearing means including a tubular member adapted to be fixed to the vehicle to be towed, and bearing members surrounding said draw bar within said tubular member.

2. In a hitch for making a draft connection between vehicles, a tubular bearing-supporting member adapted to be fixed to a vehicle, a bearing supporting sleeve within said tubular member, bearing means within said sleeve, a cushioning sleeve of resilient rubber interposed between said sleeve and said tubular member whereby a floating support is provided for said bearing means, a draw bar supported in said bearing means for sliding movement, means on one end of said draw bar for making a draft connection with another vehicle, a housing fixed to one end of said tubular member, a head on the other end of said draw bar disposed within said housing, and resilient rubber cushion elements in said housing against said head to yieldingly resist movement of said draw bar.

JOHN H. GRUBE.

REFERENCES CITED

The following references are of record in the file of this patent:

UNITED STATES PATENTS

| Number | Name | Date |
|---|---|---|
| 1,248,300 | Feigelson | Nov. 27, 1917 |
| 1,908,711 | Kuchar | May 16, 1933 |
| 2,067,794 | Seyferth | Jan. 12, 1937 |